United States Patent
Woods

(10) Patent No.: US 6,811,179 B2
(45) Date of Patent: Nov. 2, 2004

(54) MULTI-WHEELED CART

(76) Inventor: Charles F. Woods, P.O. Box 681, Libby, MT (US) 59923

( * ) Notice: Subject to any disclaimer, the term of this patent is extended or adjusted under 35 U.S.C. 154(b) by 86 days.

(21) Appl. No.: 10/139,080

(22) Filed: May 3, 2002

(65) Prior Publication Data

US 2003/0205885 A1 Nov. 6, 2003

(51) Int. Cl.$^7$ ................................................. B62B 3/02
(52) U.S. Cl. ......................................... 280/652; 280/63
(58) Field of Search .............................. 280/38, 39, 43, 280/651, 652, 659, 79.7, 47.2, 47.3, 47.31, 1.5, 63

(56) References Cited

U.S. PATENT DOCUMENTS

| | | | | |
|---|---|---|---|---|
| 1,052,953 A | * | 2/1913 | Peirce | 105/143 |
| 2,869,661 A | * | 1/1959 | Fernandez | 180/19.1 |
| 4,055,354 A | * | 10/1977 | Sharpe | 280/47.31 |
| 4,063,744 A | * | 12/1977 | Fraser | 280/42 |
| 4,214,774 A | * | 7/1980 | Kluge | 280/652 |
| 4,444,405 A | * | 4/1984 | Barrus | 280/47.3 |
| 5,620,193 A | * | 4/1997 | Dschaak | 280/47.31 |
| 5,765,843 A | * | 6/1998 | Miller | 280/79.7 |
| 5,820,141 A | * | 10/1998 | Wilkerson et al. | 280/30 |
| 5,853,189 A | * | 12/1998 | Swartzlander | 280/652 |
| 5,984,326 A | * | 11/1999 | Abraham et al. | 280/47.2 |
| 6,217,043 B1 | * | 4/2001 | Chumley | 280/40 |
| 6,260,864 B1 | * | 7/2001 | Smith | 280/47.26 |
| 6,283,496 B1 | | 9/2001 | Dickmann | |

FOREIGN PATENT DOCUMENTS

DE                3807449   *  9/1989 ............ 280/1.5

* cited by examiner

Primary Examiner—Frank Vanaman
(74) Attorney, Agent, or Firm—Wells St. John P.S.

(57) ABSTRACT

A two-wheeled cart includes a generally planar frame adapted and constructed to bear a load. At least one handle is secured to the frame. A pair of wheels is secured generally along a central axis of the frame. The wheels are arranged one substantially directly behind the other with respect to a direction of travel of the cart. In an embodiment, a pair of handles are detachably secured to the frame. The frame can further include an in-use handle mounting mechanism to retain the at least one handle in an in-use position outside the plane of the frame. A storage handle mounting mechanism can be provided to retain the at least one handle in a storage position generally coplanar with the frame. The wheels can be detachably secured to the frame.

3 Claims, 3 Drawing Sheets

US 6,811,179 B2

MULTI-WHEELED CART

FIELD OF THE INVENTION

The present invention relates generally to wheeled, human-propelled vehicles. Specifically, the present invention relates to wheeled hand carts adapted for traversing loads over rugged terrain.

BACKGROUND OF THE INVENTION

Technological advancement has provided humankind with standards of living that would have been unimaginable just a few decades ago. Communications, transportation, medicine, and materials sciences are just a few areas in which life as we know it today has been transformed. Ironically, many modern advances have been applied to satisfy the need for humans to retreat into remote wilderness areas to escape the rigors of modern life. Advances in motorized and non-motorized transportation, as well as developments in hiking and snowshoeing equipment, permit routine access to areas once seen only by the most adventurous and daring outdoorsman.

As access has improved, the need for moving articles to, from, and within such areas in rugged terrain has become apparent. Examples include transporting supplies and equipment, extracting harvested game animals, or evacuating injured persons.

In an attempt to satisfy such needs, wheeled hand carts have been developed. For example, U.S. Pat. No. 6,217,043 is directed to a portable cart assembly provided for compact storage and to facilitate portability. A body is constructed of longitudinal parallel transversely aligned tubular frame members for telescopically positioning an extensible handle. Brackets are moved for longitudinally sliding movement on longitudinal body members for carrying wheels, which are locked in position opposite each other beneath a medial portion of the load utilizing fasteners without the necessity for utilizing a transverse axle. A flexible or rigid platform support may be utilized, and a transverse brace may be removably secured to stabilize the wheels and their mountings during the transporting of a load.

In another example, U.S. Pat. No. 6,283,496 to Dickmann shows a collapsible carrier suitable for transporting a load over rugged terrain which includes a support frame assembly formed by at least a pair of spaced apart side frame members located on opposite sides of a longitudinal central axis of the frame. Cross frame members connect the side frame members to define a cargo bed. A pair of wheels located on opposite sides of the cargo bed are each individually supported by support members mounted on a pivot axis which is affixed to opposite sides of the side frame members and displaced laterally outwardly from the side frame members. The wheels are thus pivotable about these axes from a use position, wherein the wheels are parallel to each other, and disposed on opposite sides of the cargo bed to a storage/backpack transport position wherein the wheels are folded over one another and over said cargo bed. The side frame members are formed of collapsible sections that are either telescoped together or pivotally connected to each other. In the preferred embodiment the axes for the wheel supports are located outwardly from and below the cargo bed, thus enabling the wheels to be pivoted against the bottom of the cargo bed, overlying each other. In the preferred embodiment the support members, while being displaced equally outwardly from the sides of the cargo bed side frames, are of slightly different heights thus enabling stacking of the wheels as they are folded into the carrying position.

An example of a one-wheeled cart is shown in U.S. Pat. No. 5,620,193 to Dschaak, in which a game hauling cart including a frame that has a first side portion, a second side portion, and a middle portion. The first side portion of the frame has a pair of handles with a first flat bar. The second side portion has a second pair of handles with a second flat bar. The middle portion has three flat bars proportionately spaced and forming a frame base. A wheel is rotatably mounted on a shaft portion. Included are a pair uprights with each upright having a wheel end and a frame end. The wheel end of each upright receives the shaft. The frame end of each upright is welded to a lower side of one of the flat bars of the frame base. A pair of braces are provided. Each brace has a bottom end welded to one of the uprights and a pair of arms that extend upward. Each of the arms are welded to the lower side of one of the three flat bars. A rigid mesh is included and positioned within the frame. Lastly, a winch is attached to one of the flat bars between the handles.

Despite the advantages of known carts, it can be seen that the need exists for a simple, inexpensive, cart for effectively and efficiently traversing rugged terrain with a variety of loads.

SUMMARY OF THE INVENTION

These and other objects are achieved by providing a two-wheeled cart including a generally planar frame adapted and constructed to bear a load. At least one handle is secured to the frame. A pair of wheels is secured generally along a central axis of the frame. The wheels are arranged one substantially directly behind the other with respect to a direction of travel of the cart.

In an embodiment, a pair of handles are detachably secured to the frame. The frame can further include an in-use handle mounting mechanism to retain the at least one handle in an in-use position outside the plane of the frame. A storage handle mounting mechanism can be provided to retain the at least one handle in a storage position generally coplanar with the frame.

The wheels can be detachably secured to the frame. The frame can include an in-use wheel mounting mechanism to retain the wheels in an in-use position substantially perpendicular to the frame, and storage wheel mounting mechanism adapted and constructed to retain the wheels in a storage position generally coplanar with the frame.

A hand brake mechanism can be secured to the handle to selectively inhibit movement of the cart. One or more outriggers can be provided to extend angularly from the frame.

The features of the invention believed to be patentable are set forth with particularity in the appended claims. The invention itself, however, both as to organization and method of operation, together with further objects and advantages thereof, may best be understood by reference to the following description taken in conjunction with the accompanying drawings.

DETAILED DESCRIPTION OF THE INVENTION

Figure 1:
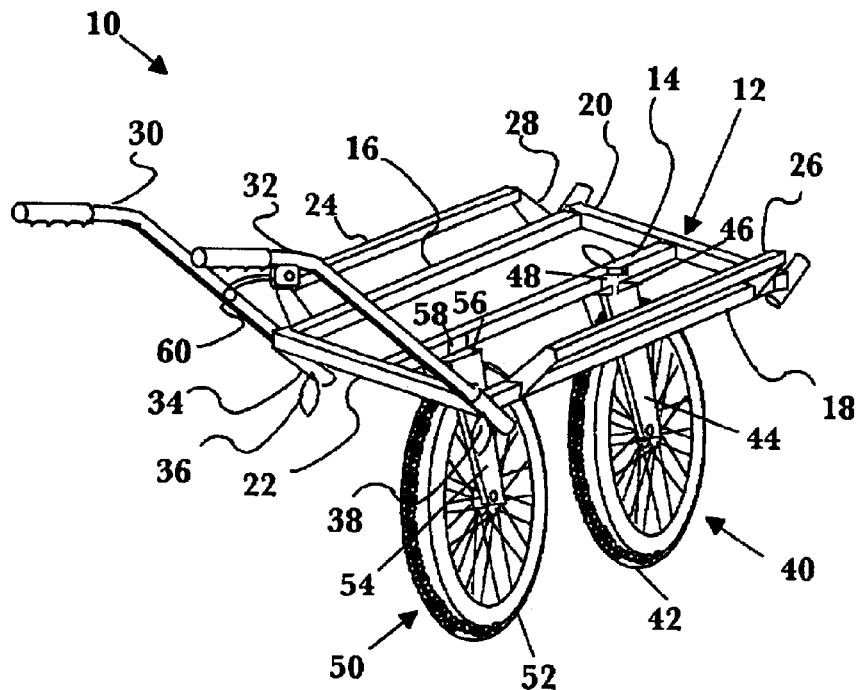
FIG. 1 is a schematic perspective view of a cart in its in-use position embodying the principles discussed herein.

While this invention is susceptible of embodiment in many different forms, there is shown in the drawings, and will herein be described in detail, exemplary embodiments, with the understanding that the present disclosure is to be considered as illustrative of the principles of the invention and not intended to limit the invention to the exemplary embodiments shown and described. A cart 10 constructed in accordance with the principles of the present invention is shown in FIG. 1. The cart 10 includes a frame assembly 12 having a center beam 14, a left side beam 16, and a right side beam 18 arranged substantially parallel to one another. The center and side beams are connected to one another by a front beam 20 and a rear beam 22. The beams can be fabricated from any suitable rigid, durable material, such as steel. It has been found that 1" square tube steel is one example of a suitable material.

A pair of outriggers 24, 26, which can be fabricated from the same material as the beams, extend angularly outwardly from the respective side beams. In the illustrated example, the outriggers 24, 26 are secured to the side beams by angled brackets 28, which can be made from a suitable material such as ¼" plate steel.

A pair of handles 30, 32 are removably secured to the frame assembly 12. The handles 30, 32 can be secured to the frame assembly 12 by insertion into a handle mounting mechanism, here shown as respective handle receivers 34. Each of the handle receivers 34 has an annular cross-section, and is provided with an inner diameter slightly larger than an outer diameter of the handles 30, 32. Once a handle is inserted into the desired handle receiver, it can be secured by any suitable mechanism, such as a releasable pins 36, 38.

A front wheel assembly 40 is secured to the center beam 14 of the frame assembly 12. The front wheel assembly 40 includes a wheel 42 supported for rotation by a fork 44 in a conventional manner. The fork 44 extends downwardly from a base plate 46. A pair of side plates 48 extend upwardly from the base plate 46 on opposite sides of the center beam 14. Aligned bores are provided through the side plates 48 and the center beam 14 to accommodate securing pins.

A rear wheel assembly 50 is secured to the center beam 14 of the frame assembly 12 substantially directly behind the front wheel 40. The rear wheel assembly 50 includes a wheel 52 supported for rotation by a fork 54 in a conventional manner. The fork 54 extends downwardly from a base plate 56. A pair of side plates 58 extend upwardly from the base plate 56 on opposite sides of the center beam 14. Aligned bores are provided through the side plates 58 and the center beam 14 to accommodate securing pins.

A caliper brake mechanism 60 can be provided to assist in handling of the cart 10 in use. The caliper brake mechanism 60 is mounted and operated in a manner known with reference to bicycles.

Figure 2:
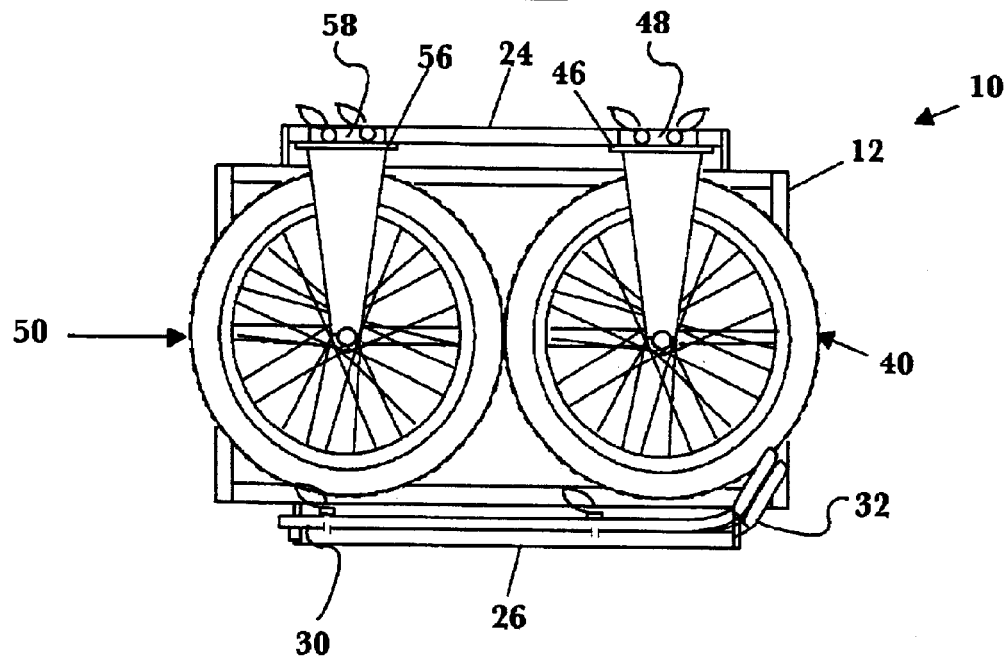
FIG. 2 is a plan view of the cart illustrated in FIG. 1 in its storage position.

The cart 10 can be converted from its in-use position shown in FIG. 1 to a storage position, illustrated in FIG. 2. In its storage position, the cart 10 can conveniently be stored, or fit into a motor vehicle or other conveyance for transport to an area in which the cart will be used. The outrigger 24 is provided with bores corresponding to and alignable with bores in the side plates 48, 58 of the wheel assemblies 40, 50. The securing pins are simply removed from the side plates 48, 58 and central beam 14. The wheel assemblies 40, 50 are placed in their storage positions, and the securing pins inserted through the bores, thus securing the wheel assemblies 40, 50 to the outrigger 24 as shown.

Similarly, outrigger 26 is provided with bores corresponding to and alignable with bores in the handles 30, 32. The securing pins are simply removed from the handles 30, 32 and handle receivers 34. The handles 30, 32 are placed in their storage positions, and the securing pins inserted through the bores and secured, thus securing the handles 30, 32 to the outrigger 26 as shown.

Figure 3:
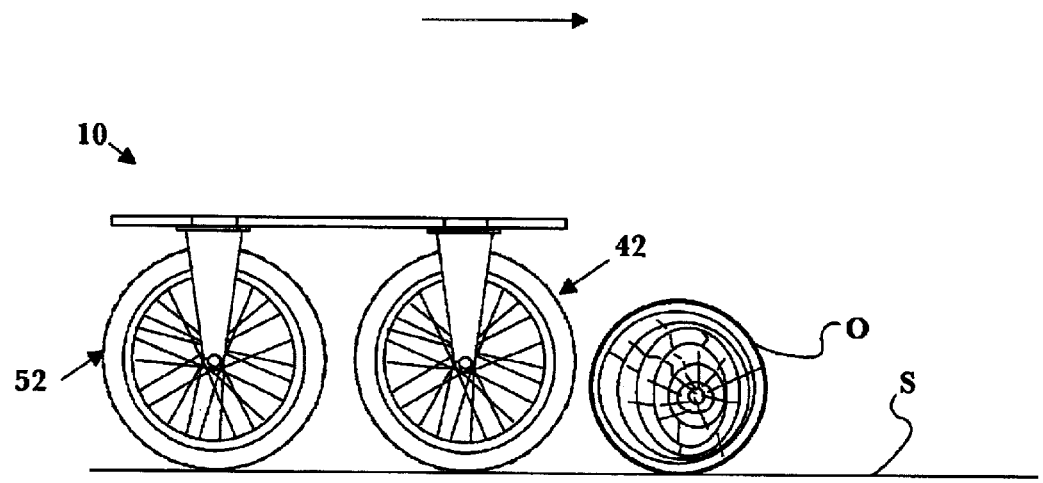
FIG. 3 schematically illustrates a first method step of an using a cart to traverse an obstacle in accordance with one embodiment of the invention.
Figure 4:
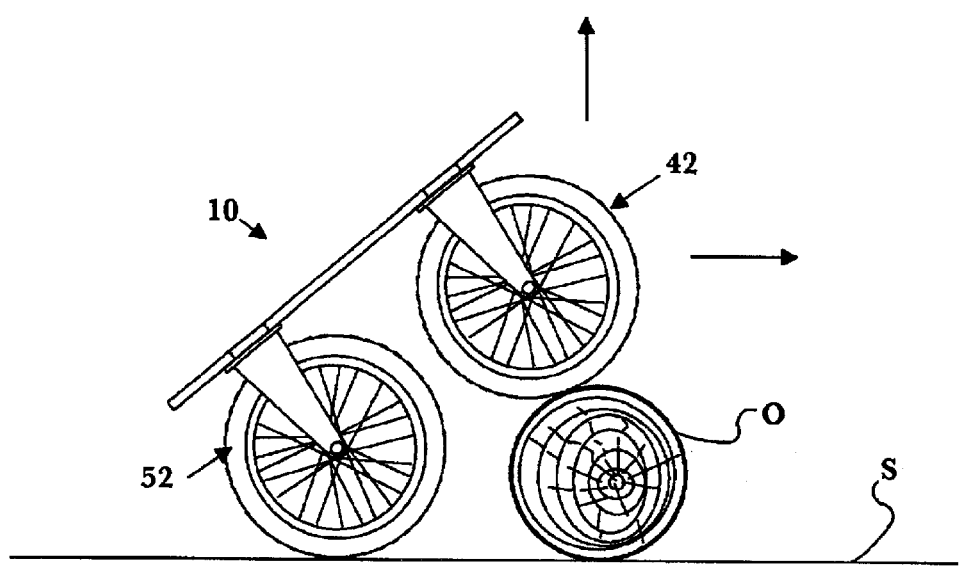
FIG. 4 schematically illustrates a method step subsequent to that shown in FIG. 3.

In addition to being easily collapsible for storage and transport, the aligned wheel arrangement of the cart 10 facilitates traversal of obstacles unattainable with other human-propelled vehicles. One example of obstacle traversal is shown step-by-step in FIGS 3–6, in which the cart 10 is shown schematically for clarity. In FIG. 3, the cart 10, traversing a surface S in the direction of arrow A1, encounters an obstacle O. The operator of the cart 10 first elevates the front wheel 42 of the cart 10 off of the surface S by using the rear wheel 52, in contact with the surface S on the first side of the obstacle O, as a fulcrum, and places the front wheel 42 of the handcart 10 into contact with the obstacle O, as shown in FIG. 4.

Figure 5:
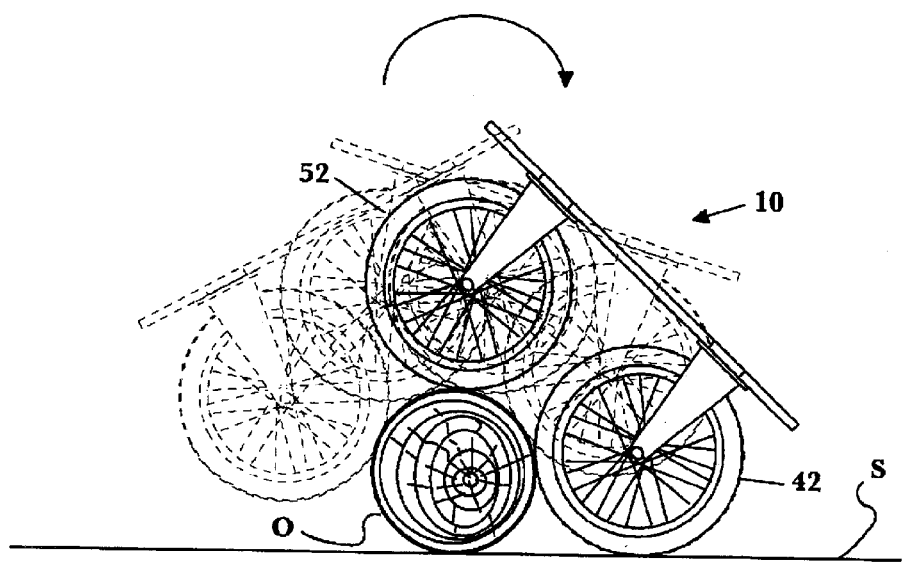
FIG. 5 schematically illustrates a method step subsequent to that shown in FIG. 4.
Figure 6:
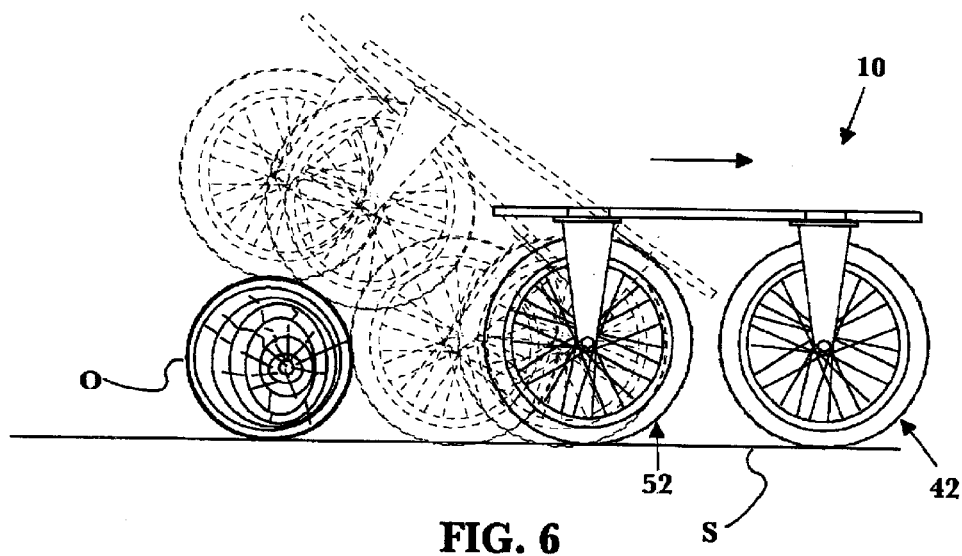
FIG. 6 schematically illustrates a method step subsequent to that shown in FIG. 5.

Next, the operator pushes the cart 10 forward to move the front wheel 42 over the obstacle O, until the front wheel 42 is in contact with the surface S on a second side of the obstacle O, as shown in FIG. 5. The operator continues pushing the cart 10 forward until both wheels 42, 52 of the cart 10 are in contact with the surface S on the second side of the obstacle O.

It is contemplated that the cart of the present invention is adaptable to a variety of uses. In addition to carrying harvested game out of wilderness areas, the present invention finds utility in transporting injured in back country. The frame assembly is ideally suited and dimensioned to carrying a standard litter used by emergency response teams to immobilize trauma victims for transportation, allowing movement of injured persons in areas inaccessible to motorized vehicles of any kind. Although the present invention has been described with reference to specific embodiments, those of skill in the art will recognize that changes may be made thereto without departing from the scope and spirit of the invention as defined by the appended claims.

What is claimed is:

1. A two-wheeled, cart comprising the following:

a generally planar frame adapted and constructed to bear a load;

a pair of handles detachably secured to the frame;

a front wheel detachably secured to a beam of the frame wherein the beam extends generally along a central axis of the frame, the front wheel having a rolling direction defining an axis of travel of the cart;

a rear wheel detachably secured to the frame behind, and in a direct line with, the front wheel;

wherein the pair of handles are detachably secured to the frame at opposite sides thereof;

wherein the frame comprises:

in-use handle mounting mechanisms adapted and constructed to retain the handles in an in-use position outside the plane of the frame; and storage handle mounting mechanisms adapted and constructed to retain the handles in a storage position generally coplanar with the frame; and a front fork having a first end detachably secured to the beam of the frame, and a second end adapted and constructed to secure the front wheel for rotation; and a rear fork having a first end detachably secured to the beam of the frame, and a second end adapted and constructed to secure the rear wheel for rotation.

2. A cart according to claim 1, wherein the frame further comprises the following:

an in-use wheel mounting mechanism adapted and constructed to retain the forks and wheels in an in-use position substantially perpendicular to the frame; and a storage wheel mounting mechanism adapted and constructed to retain the forks and wheels in a storage position generally adjacent to the frame.

3. A cart according to claim 2, wherein the wheel mounting mechanisms comprise retaining pin assemblies received in respective bores provided in the frame and forks.

* * * * *